United States Patent
Ma et al.

(10) Patent No.: US 7,905,650 B2
(45) Date of Patent: Mar. 15, 2011

(54) BACKLIGHT SUITABLE FOR DISPLAY DEVICES

(75) Inventors: Jiaying Ma, Maplewood, MN (US); Quinn Sanford, Woodbury, MN (US); Ming Cheng, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 360 days.

(21) Appl. No.: 11/467,326

(22) Filed: Aug. 25, 2006

(65) Prior Publication Data

US 2008/0049419 A1 Feb. 28, 2008

(51) Int. Cl.
 *F21V 8/00* (2006.01)
(52) U.S. Cl. ............... 362/615; 362/625; 362/627
(58) Field of Classification Search ............ None
 See application file for complete search history.

(56) References Cited

U.S. PATENT DOCUMENTS

| | | | |
|---|---|---|---|
| 4,576,850 A | 3/1986 | Martens | |
| 5,254,390 A | 10/1993 | Lu | |
| 5,414,599 A * | 5/1995 | Kaneko et al. ........... | 362/613 |
| 5,607,764 A | 3/1997 | Konno et al. | |
| 5,706,134 A | 1/1998 | Konno et al. | |
| 5,882,774 A | 3/1999 | Jonza | |
| 5,903,391 A | 5/1999 | Toshima et al. | |
| 6,018,419 A | 1/2000 | Cobb, Jr. et al. | |
| 6,080,467 A | 6/2000 | Weber | |
| 6,208,466 B1 | 3/2001 | Liu et al. | |
| 6,217,176 B1 | 4/2001 | Maekawa | |
| 6,268,961 B1 | 7/2001 | Nevitt et al. | |
| 6,368,699 B1 | 4/2002 | Gilbert et al. | |
| 6,447,136 B1 * | 9/2002 | Liu et al. ................. | 362/625 |
| 6,572,961 B1 | 6/2003 | Koyama et al. | |
| 6,602,596 B2 | 8/2003 | Kimura et al. | |
| 6,692,137 B2 | 2/2004 | Blanchard | |
| 6,693,746 B1 | 2/2004 | Nakamura et al. | |
| 6,771,335 B2 | 8/2004 | Kimura et al. | |
| 6,809,782 B1 | 10/2004 | Kawamoto | |
| 6,827,886 B2 | 12/2004 | Neavin et al. | |
| 6,888,595 B2 * | 5/2005 | Umemoto ................. | 349/113 |
| 7,033,057 B2 | 4/2006 | Su et al. | |
| 2002/0005991 A1 * | 1/2002 | Masaki et al. ........... | 359/599 |
| 2003/0184993 A1 | 10/2003 | Yamada | |
| 2005/0002172 A1 | 1/2005 | Han et al. | |
| 2005/0141212 A1 | 6/2005 | Moon et al. | |
| 2005/0259194 A1 | 11/2005 | Lee et al. | |

FOREIGN PATENT DOCUMENTS

| | | |
|---|---|---|
| CN | 1700065 | 11/2005 |
| JP | 04-329522 | 11/1992 |
| JP | (U)3010871 | 3/1995 |
| JP | 11-144512 | 5/1999 |
| JP | 2003-092018 | 3/2003 |
| JP | 2005-003753 | 1/2005 |

(Continued)

*Primary Examiner* — Sharon E Payne
(74) *Attorney, Agent, or Firm* — Robert S. Moshrefzadeh

(57) ABSTRACT

A backlight suitable for use in a display device includes an illumination device having at least one light source and a back reflector stack including a reflective layer and a transparent layer having substantially uniform refractive index and having a plurality of light-directing protrusions disposed in a matrix array. The transparent layer is disposed between the reflective layer and the illumination device with the plurality of light-directing protrusions facing away from the reflective layer. The plurality of light-directing protrusions are configured and disposed in a configuration that is not registered to any light source of the illumination device.

7 Claims, 6 Drawing Sheets

FOREIGN PATENT DOCUMENTS

| | | |
|---|---|---|
| JP | 2005-079008 | 3/2005 |
| JP | 2006-196384 | 7/2006 |
| KR | 10-1994-0004307 | 5/1994 |
| KR | 10-2004-0105899 | 12/2004 |
| KR | 10-2006-0081197 | 7/2006 |
| WO | WO 03/056384 | 7/2003 |

* cited by examiner

BACKLIGHT SUITABLE FOR DISPLAY DEVICES

FIELD OF THE INVENTION

The present disclosure is directed to backlights suitable for display devices, such as liquid crystal display devices.

BACKGROUND

Display devices, such as liquid crystal display (LCD) devices, are used in a variety of applications including, for example, televisions, hand-held devices, digital still cameras, video cameras, and computer monitors. Unlike a traditional cathode ray tube (CRT), an LCD panel is not self-illuminating and, therefore, sometimes requires an illumination assembly or a "backlight." A backlight typically couples light from one or more light sources (e.g., cold cathode fluorescent tubes (CCFTs) or light emitting diodes (LEDs)) to an LCD panel.

Two common types of backlights are direct-lit backlights and edge-lit backlights. These two types of backlights differ in the placement of the light source(s) relative to the output face of the backlight, where the output face defines the viewable area of the display device. In edge-lit backlights, a light source or light sources are disposed along an outer border of the backlight construction, outside the area or zone corresponding to the output face of the backlight. The light source (s) typically emit light into a light guide, from which light is extracted to illuminate the output face of the backlight. In direct-lit backlights, one or more light sources are disposed directly behind the output face of the backlight.

The performance of an LCD is often judged by its brightness. However, the viewing experience of a display may be compromised if the degree of brightness varies across its viewable area. This may occur where discrete light sources are used in the backlight due to the reduction of brightness with increased distance from the light source(s). Various arrangements have been proposed to combat this problem. For example, in direct-lit displays thick diffuser plates have been used to mix the light from individual light sources. In edge-lit displays, extraction dots have been placed closer together to provide increased extraction of light with increased distance from the light source(s). These solutions, however, result in loss of light due to scattering and absorption.

SUMMARY

In one implementation, the present disclosure is directed to a backlight suitable for use in a display device. The backlight includes an illumination device having at least one light source and a back reflector stack including a reflective layer and a transparent layer having substantially uniform refractive index and having a plurality of light-directing protrusions disposed in a matrix array. The transparent layer is disposed between the reflective layer and the illumination device with the plurality of light-directing protrusions facing away from the reflective layer. The plurality of light-directing protrusions are configured and disposed in a configuration that is not registered to any light source of the illumination device. In another implementation, the present disclosure is directed to a backlight suitable for use in a display device, which includes an illumination device having at least one light source and a back reflector stack including a reflective layer and a transparent layer having a plurality of beads disposed in a binder. The beads form a plurality of light-directing protrusions and the binder has a refractive index that is close to a refractive index of the beads. The transparent layer is disposed between the reflective layer and the illumination device with the plurality of light-directing protrusions facing away from the reflective layer. The plurality of light-directing protrusions are configured and disposed in a configuration that is not registered to any light source of the illumination device.

In yet another implementation, the present disclosure is directed to a backlight suitable for use in a display device, which includes an illumination device having at least one light source and a back reflector stack comprising a reflective layer and a transparent layer having substantially uniform refractive index and having a plurality of lenticular light-directing protrusions disposed in a matrix array. The transparent layer is disposed between the reflective layer and the illumination device with the plurality of light-directing protrusions facing away from the reflective layer. The plurality of light-directing protrusions are configured and disposed in a configuration that is not registered to any light source of the illumination device.

These and other aspects of the optical devices of the subject invention will become more readily apparent to those having ordinary skill in the art from the following detailed description together with the drawings.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, wherein.

DETAILED DESCRIPTION

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a film" encompasses embodiments having one, two or more films. As used in this specification and the appended claims, the term "or" is generally employed in its sense including "and/or" unless the content clearly dictates otherwise.

Figure 1:
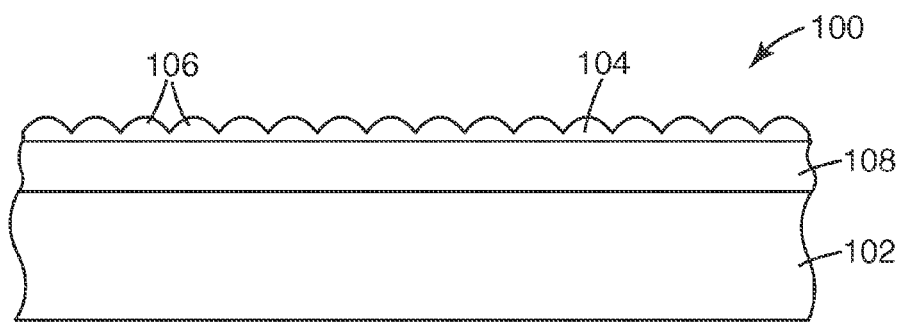
FIG. 1 is a schematic cross-sectional view of one embodiment of a back reflector stack according to the present disclosure.

FIG. 1 illustrates schematically an exemplary back reflector stack 100, which may be used in exemplary backlights according to the present disclosure. The back reflector stack 100 includes a reflective layer 102 and a transparent layer 104. The transparent layer 104 includes light-directing protrusions 106 disposed in a matrix array on a surface of the transparent layer that faces away from the reflective layer 102. Although the light-directing protrusions 106 are shown in cross-section, for the purposes of the present disclosure, they are disposed in a matrix array. In this matrix array, the individual light-directing protrusions may be disposed in a rectangular configuration having rows and/or columns, a configuration where the individual elements are angularly and/or laterally offset with respect to each other to form a pattern that cannot be fairly characterized as having rows and/or columns, or a configuration wherein the distribution of the individual elements does not follow any discernible pattern, such as a random distribution. The transparent layer 104 has a substantially uniform refractive index. Preferably, the refractive index of the transparent layer does not vary from one location to another location by more than 0.05, 0.03, more preferably 0.02 and even more preferably 0.01. In some exemplary embodiments, the back reflector stack 100 further includes an additional layer 108. The additional layer 108 may optionally include a diffuser. Any two or more of the reflective layer 102, the one or more additional layers and the transparent layer 104 layer can be, for example, separated by an air gap, stacked one over the other, or attached to one another.

Any two or more layers can be attached to each other by any suitable means or method known to those skilled in the art. For example, the transparent layer can be attached to the reflective layer by a suitable adhesive, the transparent layer can be coated onto the reflective layer and then dried and/or cured, or the transparent layer can be formed together with the reflective layer formed together, e.g., by co-extrusion. One or more of the layers, for example, polymeric layers, may be primed for improving adhesion. Exemplary priming techniques include chemical priming, corona surface treatment, flame surface treatment, flashlamp treatment and others.

In one exemplary embodiment, a diffuser film can be laminated to the reflective layer using pressure sensitive adhesive (PSA). The diffuser film can be from 5 mil to 10 mil thickness, acting as supporting substrate as well. UV absorber can be mixed into the PSA or the diffuser film to protect UV-caused yellowing of the reflective film. In other exemplary embodiments, a UV-curable adhesive may be used. In yet other exemplary embodiments, a polymeric reflector may be coextruded with a diffusive skin to achieve the diffuser effect and a UV absorber can be mixed into the skin. In other exemplary embodiments, a diffusive coating can be coated onto a reflective layer, and then the reflective layer may be laminated to a substrate such as PET or PC.

Transparent Layer

It has been found that the addition of a transparent layer having light-directing protrusions on at least one of its surfaces, disposed in the optical path of light reflected by the reflective layer, provides some advantageous optical properties. For example, the transparent layer can aid in improving brightness uniformity across an output face of a backlight, which results in improved appearance of a display using such backlights without sacrificing its overall brightness.

The light-directing protrusions can be closely packed. In some exemplary embodiments, the light-directing protrusions can be disposed side-by-side and in close proximity to one another, and, in some exemplary embodiments, in substantial contact or immediately adjacent to one another. Increasing the amount of the surface area occupied by the light-directing protrusions provides additional advantages in luminance uniformity of a backlight or optical display including a reflector stack according to the present disclosure. In other exemplary embodiments, the light-directing protrusions may be spaced from each other provided that the light-directing protrusions preferably occupy at least a majority or more (i.e., 50% or more) of the exposed useful surface area of the beaded layer, more preferably about 60% or more, still more preferably about 70% or more, and even more preferably about 90% or more.

One exemplary embodiment of a transparent layer includes lenticular light-directing protrusions. Preferably, the lenticular light-directing protrusions are substantially hemispherically shaped. Typical implementations of such exemplary embodiments include light-directing protrusions having a height that is within about 60% of the radius of that structure. More preferably, such embodiments of the present disclosure include protrusions or depressions having a height or depth that is within about 40% of the radius of that structure, and most preferably, such embodiments of the present disclosure include protrusions or depressions having a height or depth that is within about 20% of the radius of that structure. The light-directing protrusions having a height or depth that is at least within about 60% of the radius of that protrusion will be referred to as "substantially hemispherical."

Suitable exemplary radii of the substantially hemispherically-shaped protrusions include about 2, 5, 8, 10, 12.5, 15, 17.5, 20, 25, 37.5, 45, 50, 60, 70 and 80 microns and the radii contained in any range between any of these exemplary values. In some exemplary embodiments, the substantially hemispherically-shaped protrusions may be smaller, but not so small as to cause diffraction effects, or they may be larger, for example with about 100 or 150 µm radius or more. Typically, the size of substantially hemispherically shaped protrusions should be small enough so as not to be readily apparent to a viewer of a display device containing the optical film. For example, the protrusions may have a mean diameter in the range of, for example, 5 to 50 µm. Typically, the protrusions have a mean diameter in the range of 12 to 30 µm, or in some embodiments 12 to 25 µm. In at least some instances, smaller protrusions are preferred because this permits the addition of more protrusions per unit area, often providing a rougher or more uniformly rough surface or better light redirection effects.

Depending on the desired properties of the back reflector stack, the light-directing protrusions of the transparent layer may be substantially the same shape and/or size or they may be of at least two or more substantially different shapes and sizes. For example, a transparent layer constructed according to the present disclosure can include substantially hemispherically-shaped structures of a larger size and substantially hemispherically-shaped structures of a smaller size disposed between the structures of the larger size so as to cover a larger portion of a major surface of the transparent layer. In such exemplary embodiments, a radius of the smaller protrusion may be about 40% of the radius of a neighboring larger protrusion, or it may be another suitable radius that is small enough for the smaller structures to be closely packed in a two-dimensional array with the larger structures. In other exemplary embodiments the substantially hemispherically shaped protrusions may be of at least three substantially different radii or they may have a variety of different radii.

In some exemplary embodiments, the transparent layer can be made from a transparent curable polymeric material, such as low refractive index or high refractive index polymeric materials. In some exemplary embodiments, the material of the transparent layer has a refractive index of from 1.48 to 1.65. With high refractive index materials, higher optical gain may be achieved at the expense of a narrower viewing angle, while with lower refractive index materials, wider viewing angles may be achieved at the expense of lower optical gain. Exemplary suitable high refractive index resins include ionizing radiation curable resins, such as those disclosed in U.S. Pat. Nos. 5,254,390 and 4,576,850, the disclosures of which are incorporated herein by reference to the extent they are consistent with the present disclosure.

Figure 2:
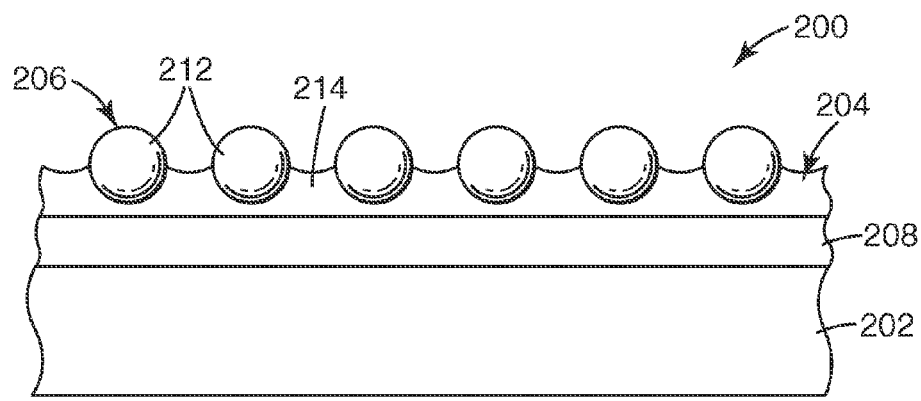
FIG. 2 is a schematic cross-sectional view of another embodiment of a back reflector stack according to the present disclosure.

Light-directing protrusions of a transparent layer according to the present disclosure may also be formed by beads. FIG. 2 illustrates schematically such an exemplary configuration of a transparent layer 204, which includes beads 212 dispersed in a binder 214. At least some of the beads 212 form protrusions 206. In addition to the transparent layer 204, the back reflector stack 200 includes a reflective layer 202 and, optionally, an additional layer 208.

Typically, the beads contained in the beaded layer are solid articles that are substantially transparent and preferably transparent. They may be made of any suitable transparent material known to those of ordinary skill in the art, such as organic (e.g., polymeric) or inorganic materials. Some exemplary materials include, without limitation, inorganic materials, such as silica (e.g., Zeeospheres™, 3M Company, St. Paul, Minn.), sodium aluminosilicate, alumina, glass, talc, alloys of alumina and silica, and polymeric materials, such as liquid crystal polymers (e.g., Vectram™ liquid crystal polymer from Eastman Chemical Products, Inc., Kingsport, Tenn.), amorphous polystyrene, styrene acrylonitrile copolymer, crosslinked polystyrene particles or polystyrene copolymers, polydimethyl siloxane, crosslinked polydimethyl siloxane, polymethylsilsesquioxane and polymethyl methacrylate (PMMA), preferably crosslinked PMMA, or any suitable combinations of these materials. Other suitable materials include inorganic oxides and polymers that are substantially immiscible and do not cause deleterious reactions (degradation) in the material of the layer during processing of the particle-containing layers, are not thermally degraded at the processing temperatures, and do not substantially absorb light in the wavelength or wavelength range of interest.

The beads generally have a mean diameter in the range of, for example, 5 to 50 µm, but other bead sizes can be used, as described above in connection with the exemplary sizes of lenticular light-directing protrusions. Depending on the application, smaller beads, larger beads or beads of different sizes are preferred. Although beads with any shape can be used, generally spherical beads are preferred in some instances. In some embodiments, the bead size distribution can be +/−50% and in other embodiments, it may be +/−40%. Other embodiments may include bead size distributions less than 40%, including a monodisperse distribution.

Typically, the binder in which beads are dispersed is also substantially transparent and preferably transparent. In most exemplary embodiments, the binder material is polymeric. Depending on the intended use, the binder may be an ionizing radiation curable (e.g., UV curable) polymeric material, thermoplastic polymeric material or an adhesive material. One exemplary UV curable binder may include urethane acrylate oligomer, e.g., Photomer™ 6010, available from Cognis Company.

The photopolymerizing prepolymers included in the ionizing radiation curable binders are incorporated in their structure with a functional group which is radical polymerized or cation polymerized by ionization radiation. The radical polymerized prepolymers are preferable because their hardening speed is high and enables to design the resin freely. Usable photopolymerizing prepolymers include acrylic prepolymers with acryoyl group such as urethane acrylate, epoxy acrylate, melamine acrylate, polyester acrylate, and the like.

Usable photo polymerizing monomers include single functional acrylic monomers such as 2-ethylhexyl acrylate, 2-hydroxyethyl acrylate, 2-hydroxypropyl acrylate, butoxypropyl acrylate and the like, two functional acrylic monomers such as 1,6-hexandiol acrylate, neopentylglycol diacrylate, diethyleneglycol diacrylate, polyethyleneglycol diacrylate, hydroxypivalate neopentylglycol acrylate and the like, and multifunctional acrylic monomers such as dipentaerythritol hexaacrylate trimethylpropane triacrylate, pentaerythritol triacrylate, and the like. These can be used individually or in combinations of two or more.

As a photo polymerization initiator, there can be used a radical polymerization initiator which induces cleavage, a radical polymerization initiator which pulls out hydrogen, or a cation polymerization initiator which generates ions. An initiator is selected from among the foregoing ones as proper for the prepolymer and the monomer. Usable radical photopolymerization initiators include benzoine ether system, ketal system, acetophenone system, tioxanthone system, and the like. Usable cation-type photopolymerization initiators include diazonium salts, diaryl iodonium salts, triaryl sulfonium salts, triaryl pyrilium salts, benzine pyridinium tiocyanate, dialkyl phenancyl sulfonium salts, dialkyl hydroxy phenylphosphonium salts, and the like. These radical type photopolymerization initiators and cation type photopolymerization initiators can be used alone or as a mixture thereof. The photopolymerization intiator is required for the ultraviolet (UV) radiation curable resins but can be omitted for the high-energy electron beam radiation curable resins.

The ionizing radiation curable material may include intensifiers, pigments, fillers, non-reactive resin, leveling agents and the like as occasion demands, besides the photopolymerizing prepolymer, the photopolymerizing monomer and the photopolymerization initiator.

The ionizing radiation curable material is included preferably in an amount of not less than 25% by weight of the binder resin of the beaded layer, more preferably not less than 50% by weight and most preferably not less than 75% by weight.

The binder may also include thermosetting resins such as thermosetting urethane resins consisting of acrylic polyol and isocyanate prepolymer, phenol resins, epoxy resins, unsaturated polyester resins or the like, and thermoplastic resins such as polycarbonates, thermoplastic acrylic resins, ethylene vinyl acetate copolymer resins or the like.

The amount of beads in the transparent layer typically depends on factors such as, for example, the desired properties of the optical film, the type and composition of the polymer used for the binder layer, the type and composition of the beads, and the index difference between the beads and the binder. The beads can be provided in amounts of, for example, at least 100 to 210 parts by weight to 100 parts by weight of the binder. In some exemplary embodiments of the present disclosure, beads can be provided in amounts of, for example, at least 120 parts by weight to 100 parts by weight of the binder, at least 155 parts by weight to 100 parts by weight of the binder, at least 170 parts by weight to 100 parts by weight of the binder, or at least 180 parts by weight to 100 parts by weight of the binder. Smaller amounts may not have a significant effect on film properties.

The beads may be provided in a volumetric amount of 45 vol % to 70 vol % of the coating. In some exemplary embodiments of the present disclosure, beads may be provided in the beaded layer in volumetric amounts of, for example, 52 vol % to 70 vol %, 58 vol % to 70 vol %, 60 vol % to 70 vol %, or 62 vol % to 70 vol %. Depending on the application, the volumetric amount of the beads in the transparent layer may be measured before the coating is dried and cured, or it may be measured after the coating has been dried and cured.

In some exemplary embodiments, the refractive index difference between the beads and the binder is in the range of, for example, from 0 to 0.05. For example, the index difference between the beads and binder can be 0.03 or less, about 0.02 or less, and more preferably about 0.01 or less.

The transparent layer including beads dispersed in a binder can also be characterized in terms of how the average binder thickness relates to a median radius of the beads. It is believed that when the dried and cured binder thickness does not depart too far from the median radius of the beads, the transparent layer will have improved light-directing characteristics. For example, it is believed that advantageous performance may be achieved where an average binder thickness over a linear inch on a major surface of an optical article (such as an optical film) is within 60%, 40% or 20% of a median radius of the beads. In other exemplary embodiments, the average binder thickness over two linear inches is within 60%, 40% or 20% of a median radius of the beads.

Dry binder thickness can be measured by making a cross-section of an exemplary optical article, taking at least 10 measurements over an inch (or two inches) of a sample using any suitable microscopic techniques and equipment, and averaging the measurements made to produce a dry average binder thickness value. Alternatively, dry binder thickness can be measured using any suitable thickness meter to measure the thickness of total film and subtracting the thickness of uncoated film.

The transparent layer including beads dispersed in a binder also can be characterized in terms of coating weight. It is believed that when the dried and cured coating weight falls within a desired range, the transparent layer will have advantageous light-directing optical characteristics. This or other advantageous purposes may be accomplished by adjusting the bead to binder ratio and/or disposing the bead/binder mixture on a substrate, such that the beaded layer mixture has a dry weight of 5 to 50 g/m2. In other exemplary embodiments, the beaded layer mixture disposed on a substrate may have a dry weight of 10 to 35 g/m2, 15 to 30 g/m2, or 20 to 25 g/m2.

A monolayer distribution of beads in the binder may also result in advantageous light-directing characteristics of the transparent layer.

Reflectors

Any type of reflective layer can be used in the back reflector stacks of the present disclosure. The reflective layer can have a reflectivity that includes a specular reflectivity component, a diffuse reflectivity component or both. In some exemplary embodiments, the reflective layer is a specular reflector. Examples of suitable reflective layers include, without limitation, metallic reflective layers, such as silver-coated or aluminum-coated mirrors or mirror films, polymeric reflective layers, such as multilayer polymeric reflective films, multilayer inorganic films, specular reflectors coated with diffuse coatings, particle-loaded polymeric films, particle-loaded voided polymeric films and back-scattering reflectors. This list of illustrative reflective polarizing elements is not meant to be an exhaustive list of suitable reflective polarizing elements. Any reflective layer that reflects, for example at least 40%, at least 50%, preferably at least 70% and, more preferably, at least 80% of incident light can be used.

Multilayer reflective layers rely on index of refraction differences between at least two different materials (preferably polymers) to specularly reflect light incident thereon. Illustrative multilayer reflectors are described in, for example, U.S. Pat. Nos. 5,882,774, 6,080,467, 6,368,699, all of which are incorporated herein by reference. One commercially available form of a multilayer reflector is marketed as Enhanced Specular Reflector (ESR) by 3M Company, St. Paul, Minn.

A suitable multilayer polymeric reflector can be made, for example, by alternating (e.g., interleaving) biaxially-oriented birefringent first polymeric optical layers with second polymeric optical layers. The term "birefringent" means that the indices of refraction in orthogonal x, y, and z directions are not all the same. For films or layers in a film, a convenient choice of x, y, and z axes includes the x and y axes corresponding to the length and width of the film or layer and the z axis corresponding to the thickness of the layer or film.

In some embodiments, the second optical layers have an isotropic index of refraction that is different from the in-plane refractive indices of the oriented layer. Alternatively, both optical layers can be formed from birefringent polymers that are oriented so that the indices of refraction. Whether the second optical layers are isotropic or birefringent, the interface between the first and second optical layers forms a light reflection plane. In some exemplary embodiments, the refractive indices of the first and second optical layers are matched along the z direction. The reflectivity of such multilayer reflectors can be increased by increasing the number of layers or by increasing the difference in the indices of refraction between the first and second layers.

Backlights and Displays

The back reflector stacks according to the present disclosure can be used in a variety of applications, including backlights suitable for display systems. Without committing to a particular theory, it is believed that the optical principle behind the new direct-lit backlights described herein is to direct only a relatively small amount of the light emitted from the back side of the light sources to the areas above the light sources that face the viewer. The result is the level of brightness in the areas above the light sources that is higher than what it would be with a specular reflector but lower than it would be with a diffuse reflector, resulting in improved overall uniformity of the backlight output.

Figure 3:
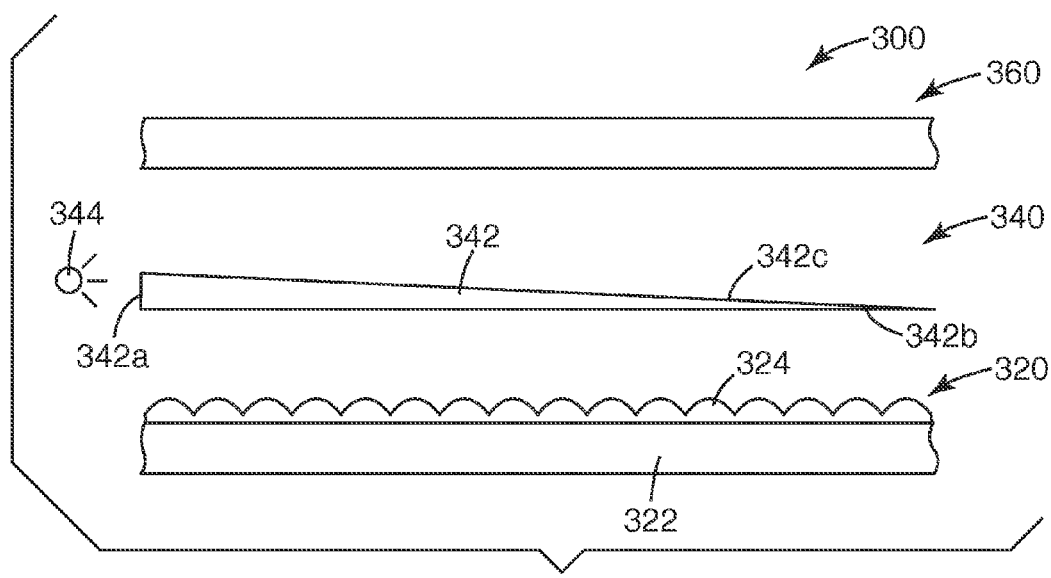
FIG. 3 is a schematic cross-sectional view of one exemplary embodiment of a backlit display according to the present disclosure.

FIG. 3 illustrates a schematic cross-sectional view of one illustrative backlit display system 300 according to the present disclosure including a display panel 360 and a backlight, which includes an illumination device 340 and a back reflector stack 320. As explained above, the back reflector stack 320 includes a reflective layer and a transparent layer 324 disposed between the reflective layer 322 and the illumination device 340. A viewer would be located on the side of the display panel 360 that is opposite from the backlight.

In this exemplary embodiment, the illumination device 340 includes a light source 344 optically coupled to (or light therefrom being caused to enter) an edge 342a of a light guide 342. After propagating within the lightguide 342, e.g., via total internal reflection in case of a solid lightguide and simple reflection in case of a hollow lightguide, light is coupled out (i.e., caused to exit) through the lightguide surface 342c facing the display and the lightguide surface 342b facing the back reflector stack. Light that exits through the lightguide surface 342b and reaches the back reflector stack 320 is then reflected by the reflective layer 322, redirected by the light-directing protrusions of the transparent layer 324 and transmitted through the lightguide 342, which is disposed in the optical path of the light reflected by the back reflector stack 320. Although the light guide 342 depicted in FIG. 3 has a generally rectangular cross-section, backlights can use light guides with any suitable shape. For example, the light guide can be wedge-shaped. In some exemplary embodiments, light sources may be disposed at two or more edges of the lightguide.

Figure 4:
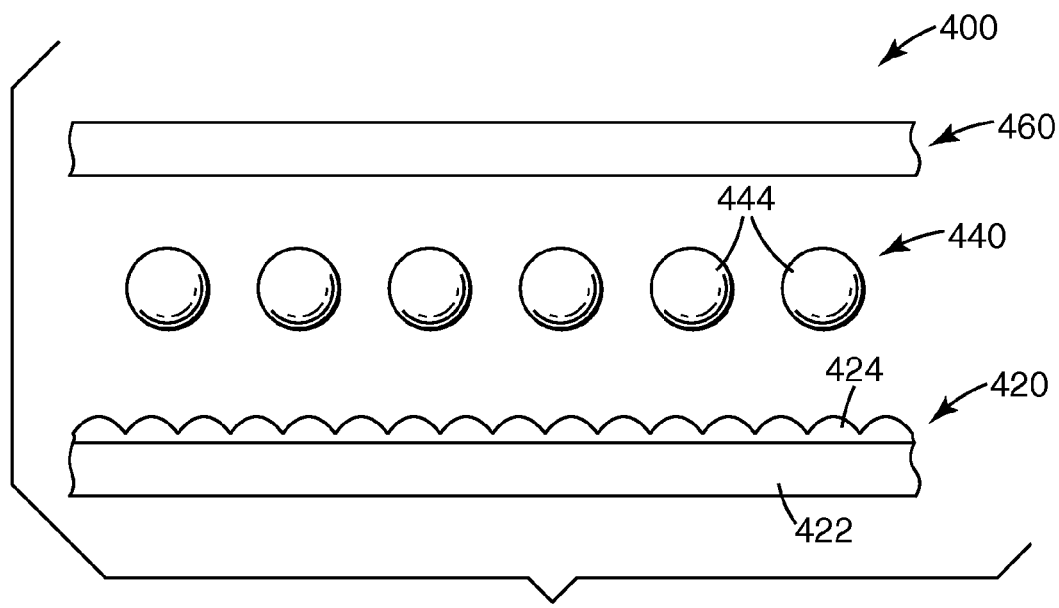
FIG. 4 is a schematic cross-sectional view of another exemplary embodiment of a backlit display according to the present disclosure.

FIG. 4 illustrates a schematic cross-sectional view of another illustrative backlit display system 400 according to the present disclosure including a display panel 460 and a backlight, which includes an illumination device 440 and a back reflector stack 420. As explained above, the reflector stack 420 includes a reflective layer 422 and a transparent layer 424 disposed between the reflective layer 422 and the illumination device 440. A viewer would be located on the side of the display panel 460 that is opposite from the backlight.

In this exemplary embodiment, the illumination device 440 includes an array (e.g., two or more) of light sources, such as elongated light sources 444, which are shown in cross-section. Light emitted by the light sources 444 that reaches the back reflector stack 420 is then reflected by the reflective layer 422 and redirected by the light-directing protrusions of the transparent layer 424. At least a large portion of that light travels back toward the light sources 444, which are disposed in the optical path of the light reflected by the back reflector stack 420, and ultimately exits the backlight through its output face and can be used to illuminate the display panel 460. In other exemplary embodiments, the lighting device may include a matrix array of light sources, such as a matrix array of LEDs.

Generally, a direct-lit type backlight, such as that illustrated in FIG. 4, may include one, two, three or more light sources disposed in the optical path of light reflected by the back reflector stack. Exemplary light sources include, but are not limited to CCFTs, LEDs or arrays of LEDs.

Figure 5:
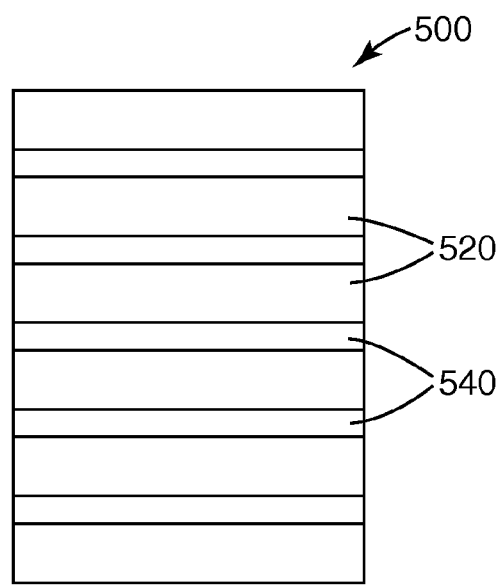
FIG. 5 is a top view of yet another exemplary embodiment of a reflective layer according to the present disclosure.

FIG. 5 shows another back reflector stack 500, which includes a plurality of diffusive areas 540 disposed over a reflective layer to form a plurality of reflective areas 520 interspersed with the diffusive areas 540. The diffusive areas, as well as reflective areas, may be in the shape of stripes. Each diffusive area 540 can be configured as a transparent layer of the present disclosure including a matrix array of light-directing protrusions.

Back reflector stacks configured as illustrated in FIG. 5 can be useful in backlights that include illumination devices having linear or matrix arrays of light sources. In such exemplary backlights, projections of the light sources onto the reflective layer should be aligned with the diffusive areas, while the projections of openings between the light sources should be aligned with the reflective areas. In some exemplary embodiments, the centers of projections of the light sources onto the reflective layer should be aligned with the centers of the diffusive areas. The widths of the diffusive areas may be from about 2 to 3 times the width of the corresponding projection of the light source onto the reflective layer. In such exemplary configurations of back reflector stacks, the light-directing protrusions of the diffusive areas 540 are registered to the light sources of the backlight.

However, in typical exemplary backlights according to the present disclosure, the light-directing protrusions of the transparent layer are configured and disposed in a configuration that is not registered to any light source. In other words, backlights of the present disclosure do not possess any correlation between the shape and/or size of the light-directing protrusions and the location, shape and/or size of the light source(s). This feature contributes to increased speed and simplicity of manufacturing the transparent layers and the backlights including such transparent layers, which in turn can result in significant cost savings.

Generally, in addition to the components described above, the backlight can include any other suitable film. For example, one or more diffusers, reflective polarizers, multi-layer reflective polarizers, such as Vikuiti™ Dual Brightness Enhancement Film (DBEF), available from 3M Company, absorbing polarizers, and structured surface films, such as Vikuiti™ Brightness Enhancement Film (BEF), available from 3M Company, can be included. Other suitable additional films include beaded diffuser films including a transparent substrate and a diffuser layer disposed thereon, the diffuser layer including beads or particles disposed in a binder. Suitable beaded diffusers are described, for example, in U.S. Pat. Nos. 5,903,391, 6,602,596, 6,771,335, 5,607,764 and 5,706,134, the disclosures of which are hereby incorporated by reference herein to the extent they are not inconsistent with the present disclosure. One exemplary embodiment of a backlight display system may include a backlight, an optical article according to the present disclosure, a display medium and one, two, three or more beaded diffuser films disposed between the optical article and the display medium.

Another advantage of exemplary reflector stacks constructed according to the present disclosure is that in most backlights they contribute to increased on-axis brightness. Not wishing to be bound by a particular theory, it is believed that this increase of on-axis brightness results from the refractive properties of the light-directing protrusions of the transparent layer. In particular, light being incident onto the transparent layer at high angles, is likely to experience multiple refractions and/or total internal reflection(s) at the interface of the material of the transparent layer and air. Such refractions and/or reflections are expected to cause high angle incident light to be redirected closer to the axis orthogonal to the display panel.

This effect can be particularly useful in some backlights that include wedge-shaped light guides. Light escaping the output side of a wedge-shaped light guide that faces a reflector stack is usually incident onto the reflector stack at high incident angles. In some exemplary embodiments, a large portion of light will exit a wedge-shaped light guide at about 70 degrees, but the exact angle will vary depending on the application. Because a typical display is intended to be viewed from a direction orthogonal to the display panel, the above-mentioned redirection of high-angle incident light can result in a better viewing experience.

EXAMPLES

The present disclosure will be further illustrated with reference to the following examples representing properties of the back reflector stacks and backlights constructed according to the present disclosure.

Example 1

Figure 6:
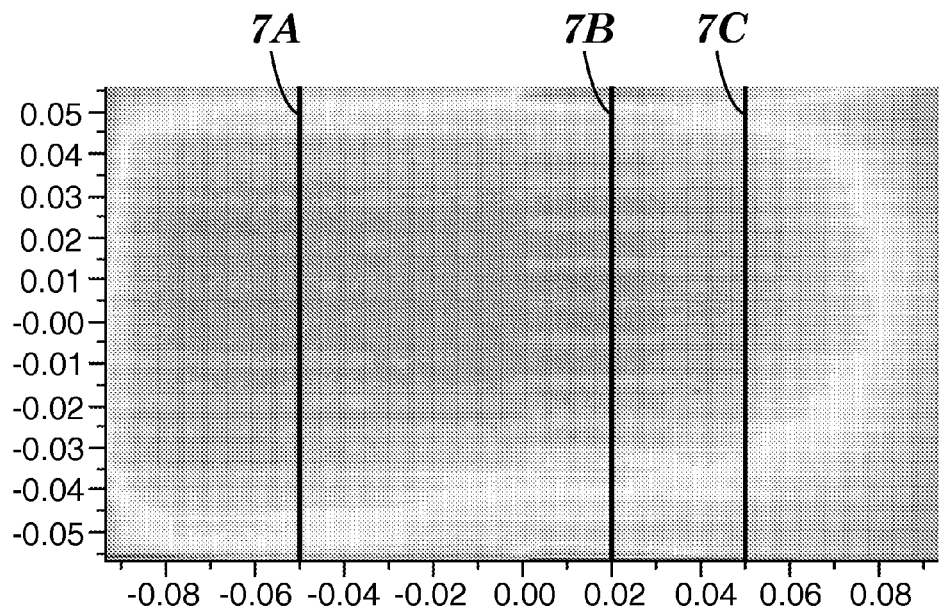
FIGS. 6 and 7A-7C illustrate brightness uniformity improvement due to the embodiments of the present disclosure as compared to available reflectors.

FIGS. 6 and 7A-7C can be used for comparison of bulb hiding capability of the new back reflector stack to an available white diffusive back reflector and an available specular back reflector. These figures were obtained using a 10 bulb Sharp 30" LCD TV, model No. LC-30HV4V. The original TV comes with 12 CCFL bulbs and a white back reflector. Modifications of the back reflector were performed for the purposes of these examples. FIG. 6 is a digital image taken with a digital camera (Photometric Color CCD Light Measurement System, Radiant Imaging Co, Duvall, Wash., USA). Vertical lines show where the luminance profiles were taken for three different back reflector regions to produce FIGS. 7A-7C.

Figure 7A:
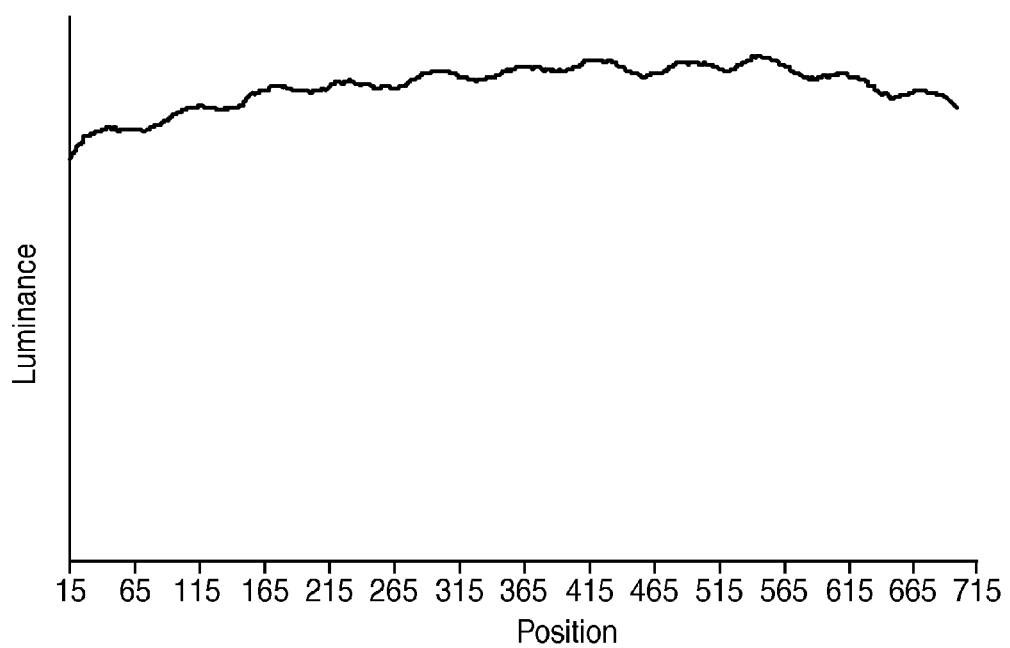
Figure 7B:
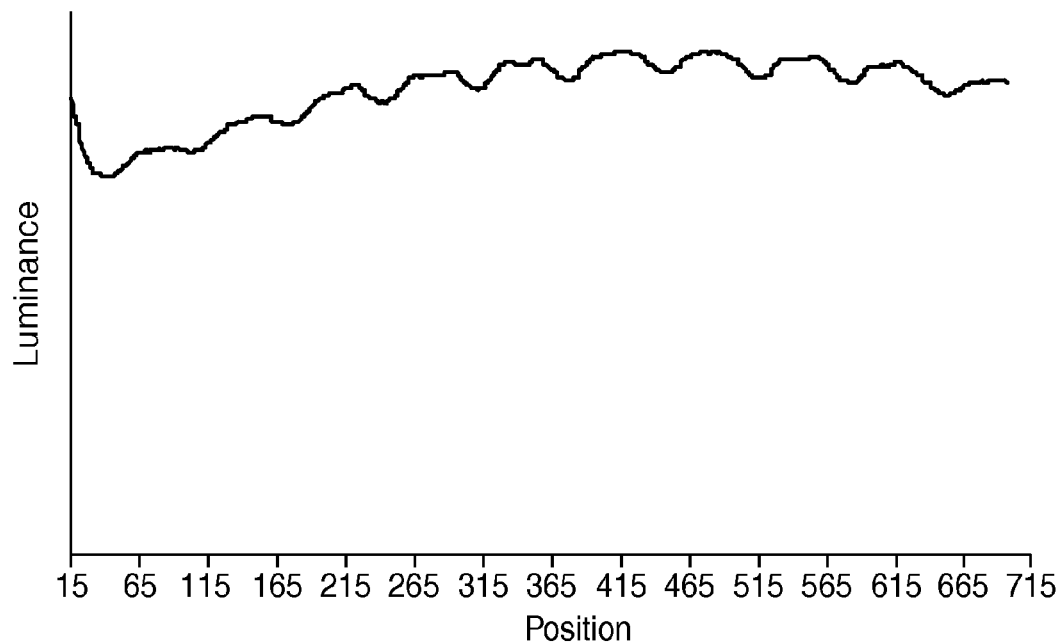

CCFL bulb images can be seen on the screen with the original TV set, indicating poor brightness uniformity, which is illustrated in the right-most portion of FIG. 6 and FIG. 7A, which is a plot of luminance along the vertical line 7A shown in FIG. 6. The middle portion of the white back reflector was then replaced by a piece of ESR film with the rest of the TV backlight unchanged. The bulb images on the screen were still clearly visible, which is apparent from the middle portion of FIG. 6 and illustrated in more detail in FIG. 7B. A third, left-most portion of the white back reflector was then replaced by a piece of a back reflector stack according to the present disclosure, which is shown in the left-most portion of FIG. 6.

Figure 7C:
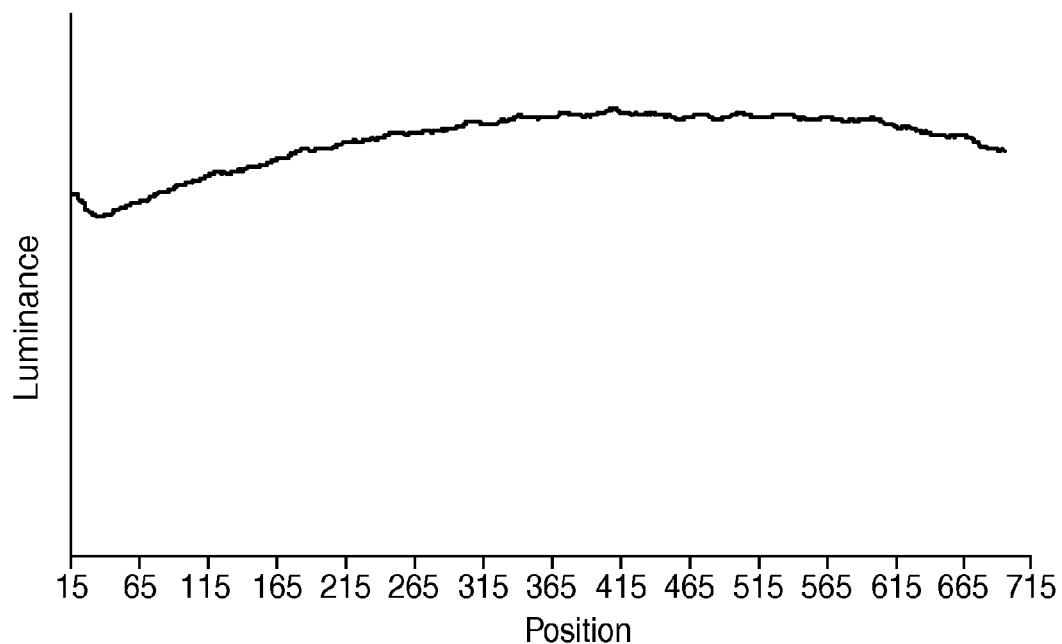

Here, the transparent layer including beads and binder was a beaded diffuser type BS-04 obtained from Keiwa Co. Ltd, Osaka, Japan. The transmission and haze of this beaded were measured to be 98% and 89.1%, as measured by Haze-gard Plus, BYK Gardner, Silver Spring, Md., USA. The gain of the beaded diffuser was measured to be 26% by a Gain Tester. The Gain Tester consists of a broadband light source (Fostec DCR II Light Source, Schott Fostec, Auburn, N.Y.), a Teflon box, and a PR650 Spectrophotometer (Photo Research Inc., Chatsworth, Calif.). The Teflon light box creates a Lambertian diffuse surface. On-axis brightness measured from the sample is ratioed to on-axis brightness of the light box, which is calculated as the gain of the optical film under test. ESR film was used as a reflective layer. Brightness uniformity on the screen was significantly improved, as illustrated in FIGS. 6 and 7C.

From these data, one can conclude that exemplary embodiments of the present disclosure have better bulb hiding capability than the diffusive white back reflector and the specular back reflector.

Example 2

Figure 8:
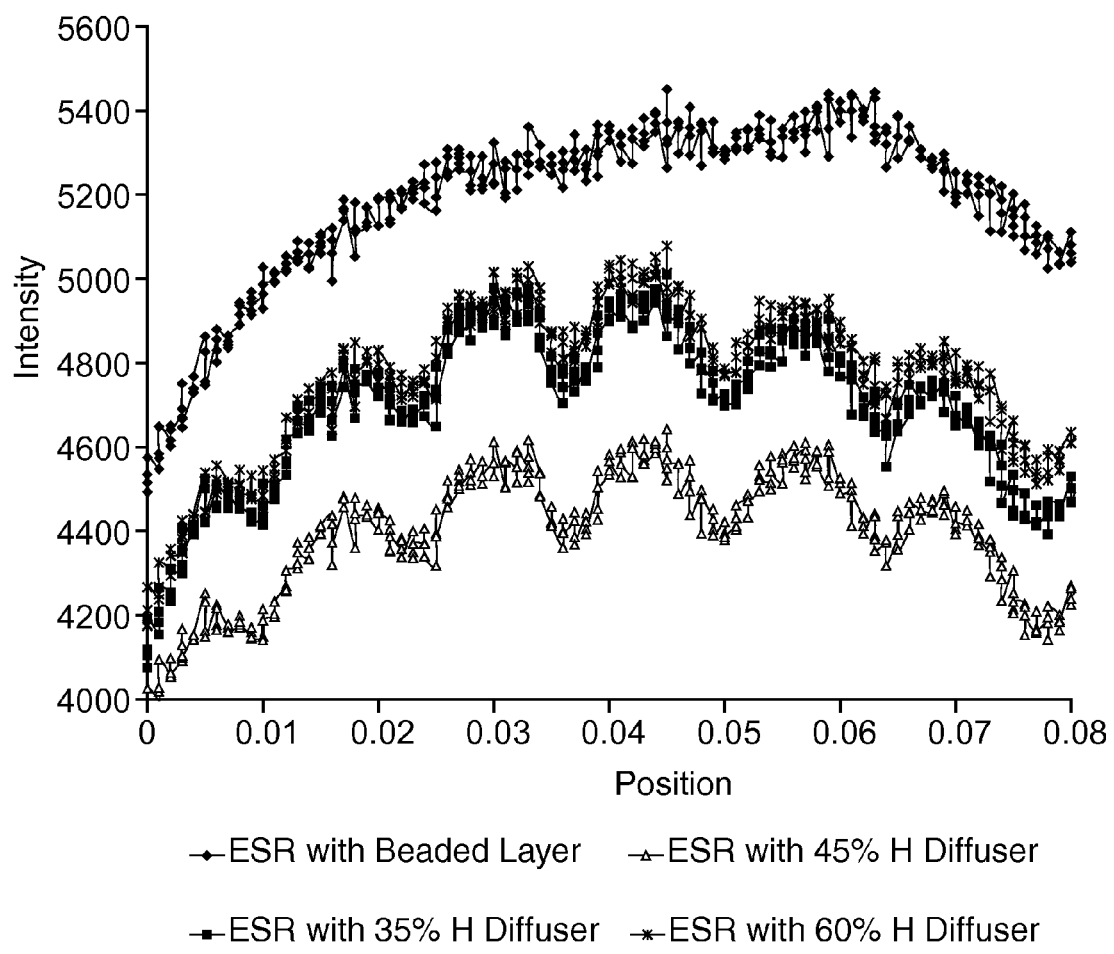
FIG. 8 is a graph showing intensity distributions across a display with different types of back reflectors.

This example shows that an exemplary reflector stack according to the present disclosure can improve brightness uniformity much more efficiently than conventional diffusive reflectors. The backlight in this Example was a testing bed with 35 mm bulb spacing and 17 mm cavity depth, which is close to a conventional 12 bulb-based 32" LCDTV. Top films included a 2 mm diffuser plate and DBEF with BEF prisms coated onto it (DTV).
In addition to an exemplary reflector stack according to the present disclosure (which was the same as that of Example 1), diffusive reflector films comprising ordinary diffuser films with varied haze levels were tested in the testing bed for degree of output brightness uniformity improvement. Diffusive films with haze levels of 35%, 45%, and 60% (as measured by Haze-gard Plus, BYK Gardner, Silver Spring, Md., USA) were laminated to ESR, and used as back reflectors in the test. FIG. 8 shows the intensity cross-sections in the vertical direction of the display for each type of the back reflector stack, taken by a digital camera (Photometric Color CCD Light Measurement System, Radiant Imaging Co, Duvall, Wash., USA). The individual peaks in FIG. 8 correspond to individual CCFL bulbs. From this figure, it is readily apparent that the reflector stack according to the present disclosure provides the best output brightness uniformity improvement.

Example 3

For this example, the transparent layer was the same beaded diffuser as used in Example 1—a beaded diffuser from Keiwa, "OPALUS BS-04" 140 μm thickness on 100 μm PET substrate, with the haze level 89.5%, as measured by Haze-gard Plus, BYK Gardner, Silver Spring, Md., USA. This transparent layer was laminated to ESR film using Opt1 pressure sensitive adhesive (PSA).

Figure 9:
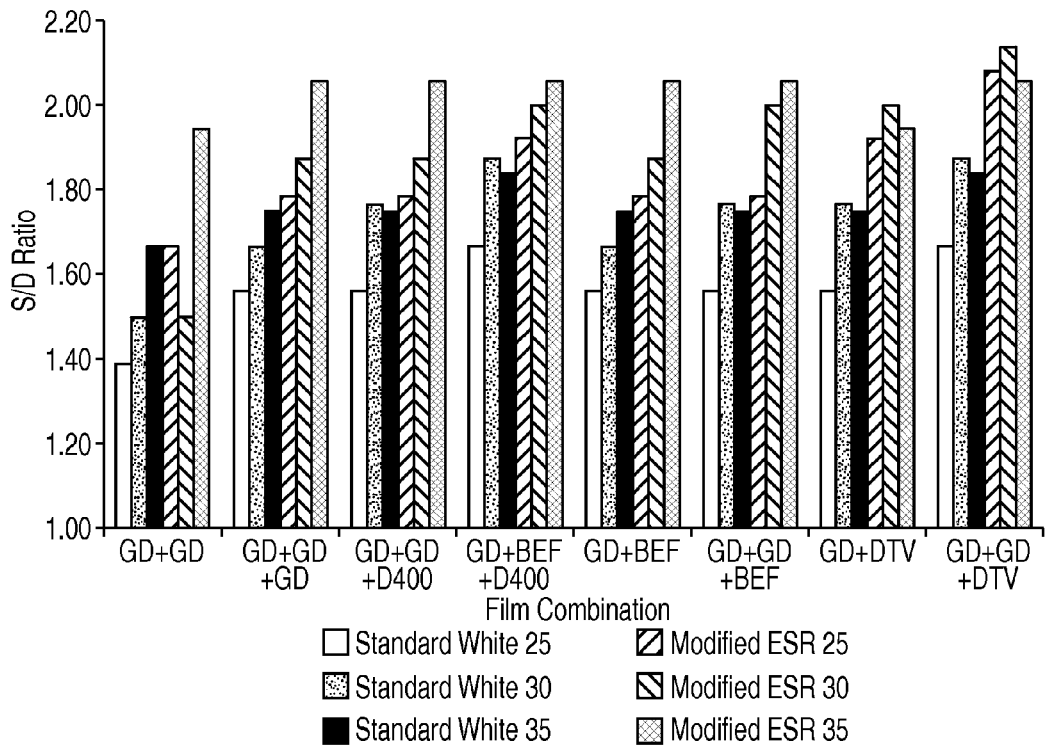
FIG. 9 is a plot showing S/D ratios of different cavity constructions corresponding to the state when bulbs were not visible.
Figure 10:
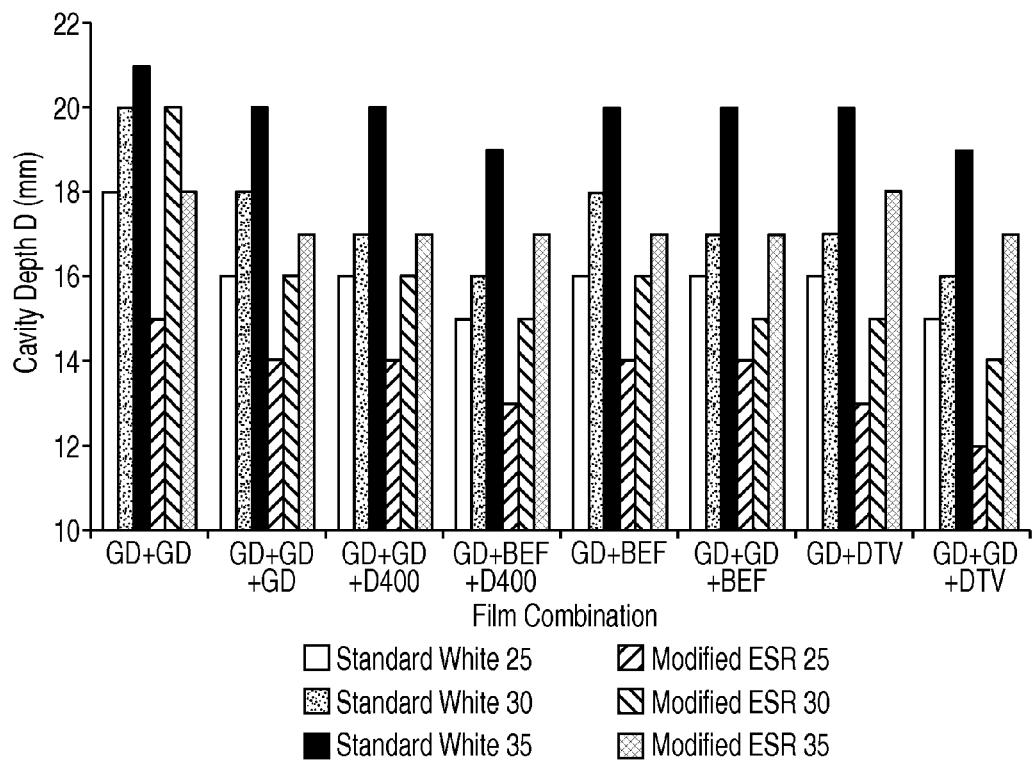
FIG. 10 is a plot showing cavity depths of different cavity constructions corresponding to the state when bulbs were not visible.

Three testing beds were used, with bulb spacings at 25 mm, 30 mm, and 35 mm respectively. Different combinations of front films are used, including a commercially available beaded diffuser for an LCD TV (GD), DBEF (D400), BEF, and DBEF with BEF. Standard white reflectors and the back reflector stacks according to the present disclosure were used as the back reflectors. FIG. 9 and FIG. 10 show the testing results, which compare the performance of a back reflector stack according to the present disclosure ("Modified ESR") with a conventional diffuse white back reflector ("Standard White"). The data was based on visual inspection and represented the condition when bulbs were not visible on the films. 2 mm diffuser plate was used above the bulbs.

FIG. 9 shows S/D ratios of different cavity constructions when bulbs were not visible with an unaided eye (good bulb hiding). S is the bulb spacing and D is the cavity depth defined as the distance between the back reflector and the bottom of the diffuser plate. From FIG. 9, it can be seen that the back reflector stack of the present disclosure increases the S/D ratio to 1.8-2.1 as compared to that with standard white reflector (1.4 to 1.85). For a typical 32" LCDTV, S/D ratio of 2.1 means 10 bulbs can be used instead of standard 16 bulbs, and S/D ratio of 1.95 means 12 bulbs instead of 16 bulbs can be used.

FIG. 10 shows, in turn, cavity depths (Ds) of different cavity constructions when bulbs were not visible with an unaided eye (good bulb hiding). As demonstrated in FIG. 10, the inventive back reflector stack provides the following two advantages:
  (i) With a certain bulb spacing (25 mm, for example), thinner backlight design can be enabled. The cavity depth can be reduced to 12-14 mm from 15-18 mm depth, dependent on film combination.
  (ii) The cavity depth for 25 mm bulb spacing with standard white back reflector is very close or identical to that of a diffusive ESR back reflector and bulb spacing of 35 mm. This means diffusive ESR back reflector can help reduce the number of bulbs without changing cavity depth.

Although the optical articles and devices of the present disclosure have been described with reference to specific exemplary embodiments, those of ordinary skill in the art will readily appreciate that changes and modifications may be made thereto without departing from the spirit and scope of the present disclosure.

What is claimed is:

1. A backlight suitable for use in a display device, comprising:
   an illumination device comprising at least one light source; and
   a back reflector stack comprising a reflective layer and a transparent layer comprising a plurality of beads disposed in a binder, the beads forming a plurality of light-directing protrusions and the binder having a refractive index that is within 0.1 of a refractive index of the beads, the transparent layer being disposed between the reflective layer and the illumination device with the plurality of light-directing protrusions facing away from the reflective layer;
   wherein the plurality of light-directing protrusions are configured and disposed in a configuration that is not registered to any light source of the illumination device.

2. The backlight as recited in claim 1, wherein the refractive index of the binder is within 0.05 of the refractive index of the beads.

3. The backlight as recited in claim 1, wherein the binder comprises an ionizing radiation curable material.

4. The backlight as recited in claim 1, wherein the illumination device comprises a lightguide disposed in the optical path of light reflected by the back reflector stack and at least one light source optically connected to an edge of the lightguide.

5. The backlight as recited in claim 4, wherein the lightguide is wedge-shaped.

6. The backlight as recited in claim 1, wherein the illumination device comprises at least one light source disposed in the optical path of light reflected by the back reflector stack.

7. The optical article of claim 1, wherein the light-directing protrusions formed by beads cover at least about 50% per unit area of a major surface of the transparent layer.

* * * * *